United States Patent [19]

Arras et al.

[11] Patent Number: 5,323,453
[45] Date of Patent: Jun. 21, 1994

[54] POWER DOWN FEED

[75] Inventors: Juho Arras, Stockholm; Mats C. S. Olstedt, Bromma, both of Sweden

[73] Assignee: Telefonaktiebolaget L M Ericsson, Stockholm, Sweden

[21] Appl. No.: 669,615

[22] Filed: Mar. 14, 1991

[30] Foreign Application Priority Data

Mar. 15, 1990 [SE] Sweden .............................. 9000929-1

[51] Int. Cl.⁵ ............................................. H04M 3/24
[52] U.S. Cl. ................... 379/322; 379/398; 379/400
[58] Field of Search ............... 379/322, 324, 398, 400, 379/403, 279

[56] References Cited

U.S. PATENT DOCUMENTS

| 4,254,305 | 3/1981 | Treiber | 379/324 |
| 4,410,766 | 10/1983 | Beirne | 379/324 |
| 4,653,088 | 3/1987 | Budd et al. | 379/413 |
| 4,760,379 | 7/1988 | De Phillipo et al. | 379/378 |
| 4,856,059 | 8/1989 | Halbig | 379/399 |

FOREIGN PATENT DOCUMENTS

| 2551916 | 7/1981 | Fed. Rep. of Germany . | |
| 3431074 | 2/1986 | Fed. Rep. of Germany | 379/322 |
| 1-57866 | 3/1989 | Japan | 379/322 |
| WO84/00459 | 2/1984 | PCT Int'l Appl. . | |
| WO84/01249 | 3/1984 | PCT Int'l Appl. . | |
| WO84/01250 | 3/1984 | PCT Int'l Appl. . | |
| 1489143 | 10/1977 | United Kingdom . | |
| 2064915 | 6/1981 | United Kingdom . | |
| 2071461 | 9/1981 | United Kingdom | 379/322 |

OTHER PUBLICATIONS

Patent Abstracts of Japan, vol. 6, No. 107 (L-113)(-57-37967). (abstract only).
Patent Abstracts of Japan, vol. 8, No. 194 (E-264) (59-81960).(abstract only).

Primary Examiner—James L. Dwyer
Assistant Examiner—Ahmad F. Matar
Attorney, Agent, or Firm—Burns, Doane, Swecker & Mathis

[57] ABSTRACT

An arrangement for feeding the subscriber's lines (10) of a public exchange with reduced line current upon the occurrence of a power failure, when the temperature within the public exchange or the temperature of individual components, mounted on circuit boards on which line interface circuits are present, exceeds a predetermined reference value, when the length of a subscriber's line is less than a line length reference value, or when the conversation time on a subscriber's line exceeds a conversation time reference value. All subscriber's lines or individual subscriber's lines only are fed with the reduced line current for a restricted time (FIG. 5B).

24 Claims, 6 Drawing Sheets

POWER DOWN FEED

BACKGROUND ART

The present invention is intended for use in telephone exchange modules of the kind which include a magazine which houses subscriber line circuits, a regional processor which forms the main control means of the line interface circuits, and associated circuits, such as ring generators, tone receivers, time selectors, for instance. The telephone exchange module is normally dependent on central group selectors which serve several telephone exchange modules. Each subscriber line circuit is connected to a respective subscriber over a telephone line. Normally, eight line circuits are combined on a circuit board, a so-called line board, although one line board may contain fewer or more line circuits. The remaining circuits of the module are also incorporated on circuit boards. The module as a whole thus comprises a large number of circuit boards which are arranged parallel with one another in a magazine. The circuit cards in a magazine are normally cooled by means of conventional convection-air-cooling systems. A local telephone exchange may comprise one or more such magazines. The magazines are placed in cabinets positioned in a room equipped with an air-conditioning system which functions to maintain the air temperature in the room within appropriate limits, these limits being selected so that the function of the telephone exchange module will be ensured irrespective of the ambient temperature. Energy is supplied to the magazine of a telephone exchange module from the mains network, via a conventional current supply unit comprising a rectifier and smoothing circuits. The local telephone exchange also includes a reserve current source, in the form of batteries. This reserve current source is used in the event of a mains failure, so that telephone traffic is able to continue unimpeded.

In unfavourable circumstances, for instance unsuitable positioning of the module or a failure in an air-conditioning system, the ambient temperature of the telephone exchange may rise to 40°-50° C., which can result in undesirable functional disturbances.

A telephone exchange, and not only a telephone exchange of the aforedescribed kind, but also telephone exchanges in general, must be dimensioned in accordance with its peak load. It is normally a requirement that telephone traffic shall be able to continue at peak load periods while maintaining a high sound quality, among other things. This creates dimensioning problems, among other things because the boards present in the magazine generate considerable heat during peak load periods. The development of heat in an underlying magazine influences, to some extent, the ambient temperature of an overlying magazine. Since the boards are densely packed side-by-side in a magazine, the heat generated adjacent one board will also influence the ambient temperature of adjacent boards. Such thermal influence is unfavourable and requires the use of circuit board components which are highly tolerable to heat, in order to ensure reliability in operation. This is expensive.

In order to dimension the telephone exchange so that it is able to manage all traffic during a peak load period, it is necessary to dimension the batteries so that they are able to deliver the power required to operate the exchange during a peak load period in the event of a mains failure. The batteries must therefore be dimensioned to deliver a high power output over a specified operating time, typically four hours. This makes the batteries expensive and bulky.

The temperature of a line board can also increase when a subscriber line is short, wherein the line has a low ohmic resistance and a high current passes through those circuits through which current is supplied to the line, hereinafter referred to as supply circuits. These supply circuits will therewith be heated. If, on the other hand, the subscriber line is long, its ohmic resistance will be high and a small current will pass through the supply circuits, which are thus not heated.

Another source resulting in the heating of line board components is the length of the call or conversation being made. The longer a call, the longer the line board components remain active and the more heat generated by these components.

Another source of heat is the number of lines which are active simultaneously on each line board.

German patent DE 25 51 916 relates to a device for reducing the loop current of a subscriber line in order to keep heat losses low. A control signal, derived from the loop current is used to select either a normal or a reduce line supply voltage. Should the loop current exceed a threshold value—as is the case for short subscriber lines, then the reduced supply voltage is selected and the loop current will drop. A reduced loop current is preferred in order to keep heat losses in the line circuit low thus allowing the use of cheap resistors in the line circuit. This selection is made at the occasion when the subscriber line is connected to the exchange. Once the supply voltage has been selected it is never changed.

This known device is of a static nature and will not account for varying operating conditions prevailing in the exchange such as for example an increase of the traffic intensity, an increase of the ambient temperature of the exchange or switching to battery operation of the exchange.

DISCLOSURE OF THE INVENTION

One object of the present invention is to reduce the power losses on each line board in dependence on prevailing, detected operation parameters.

Another object of the invention is to reduce the power requirement (ampere hours) which the reserve batteries must be capable of supplying in order for the telephone exchange to manage traffic peaks during peak load periods.

These objects are achieved by introducing an additional line supply state for the line circuits. This additional line supply state is characterized in that the subscriber line is supplied with a line current which follows a predetermined line-current/line-voltage characteristic which when the line current exceeds a predetermined value has a progress which corresponds to the progress obtained when the subscriber line is supplied from a high-ohmic supply circuit. This reduces the line current, and therefore also power losses. In some cases, the reduced line current will impair sound quality, although this quality is still acceptable, and hence the traffic is able to proceed with no limitation in traffic strength.

The state in which supply is effected with reduced line current is referred to in the following as the RP-state of the subscriber line (reduced power supply). The characteristic features of the invention are set forth in the following claim 1.

The supply resistance to a subscriber line varies from country to country and may also vary within a country, from administration to administration. For this reason, and also for other reasons not specified here, present-day line circuits include a line voltage supply circuit which functions to measure the line voltage of a subscriber and to produce a corresponding line voltage signal, a current control circuit in which a number of line-current/line-voltage characteristics are stored and which has a first input for the line voltage signal, a second input for a selector signal for selecting a predetermined characteristic from among said characteristics, and an output for producing a control signal whose value corresponds to the line current prescribed by the selected characteristic and the prevailing line voltage, and a current supply device having an input and an output, said input being connected to the output of the current control circuit for receiving the control signal, and said output being connected to the subscriber line for the purpose of supplying to said line the line current which corresponds to the current prescribed by the control signal.

A current supply device of this kind is known from our WO publications 84/00459, 84/01249 and 84/01250.

The selection signal intended for the selection of characteristics in control circuits is delivered from a main control unit which is connected to the line circuits through a bus line which is common to all line circuits. The selection signal normally has the form of a combination of data signals, which may have a high or a low logic level and which are transmitted on a number of data lines in a bus line. Each signal combination is corresponded by a respective characteristic. The main control unit is programmed to deliver the selection signal which corresponds to the characteristic which in turn corresponds to the supply resistance used by the administration. The program in the main control unit generates the selection signals. This obviates the need of manufacturing, storing and retailing line boards which incorporate supply circuits which include mutually different resistances.

The invention enables different characteristics to be selected for activating supply to the subscriber line with a reduced line current prescribed by a new characteristic selected so that all subscriber lines, or selected subscriber lines, are supplied temporarily by a high-ohmic supply circuit, in order to therewith reduce power losses.

According to the present invention, activation of a characteristic which corresponds to the RP-state can be initiated by several different operation parameters, for instance the prevailing temperature (TAMB) in the room or space in which the magazine is stored, the temperature ($T_j$) adjacent an individual line board or within an individual component on a line board, the length (L) of a subscriber line, the duration (t) of a telephone call or the number (N) of active subscriber lines on one and the same line board. The RP-state is preferably activated when the following combinations of operation parameters are fulfilled:

The ambient temperature (TAMB) is higher than a predetermined reference value ($T^+{}_{AMB}$), wherein the line circuits of all line cards are supplied with reduced line current;

the ambient temperature is higher than a predetermined reference value ($T^+{}_{AMB}$) and the number of active lines (N) on individual line boards is greater than a predetermined reference value ($N_o$), wherein only those line circuits found on these individual line boards are supplied through a high-ohmic circuit;

the ambient temperature (TAMB) is higher than a predetermined reference value ($T^+{}_{AMB}$) at the same time as the duration (t) of the call or conversation exceeds a predetermined reference value ($t_o$) and/or the length (L) of the subscriber line is shorter than a predetermined reference value ($L_o$), wherein only the line circuit concerned is switched to the RP-state;

the temperature ($T_j$) of an individual component in a line board is higher than a predetermined reference value ($T^+{}_j$), wherein only the line board which includes said component is switched to supply with reduced line current;

a combination of the aforesaid operation parameters.

The purpose of utilizing a mutual combination of several operation parameters to initiate activation of the RP-state is to reduce the operation time with reduced supply, since in some instances this reduced supply may impair the electroacoustic properties of the telephones concerned. Consequently, it is desired to maintain the shortest possible operation time in the RP-state, so that the interference with the normal operation of the telephone exchange will not have a disturbing effect on the subscribers.

In the event of a power failure, causing an interruption in the conventional current supply to the telephone exchange, all line circuits which are controlled by the aforesaid operation parameter combinations are switched to the RP-state.

BRIEF DESCRIPTION OF THE DRAWINGS

The invention will now be described in more detail with reference to the accompanying drawings, in which.

BEST MODES OF CARRYING OUT THE INVENTION

Figure 1:
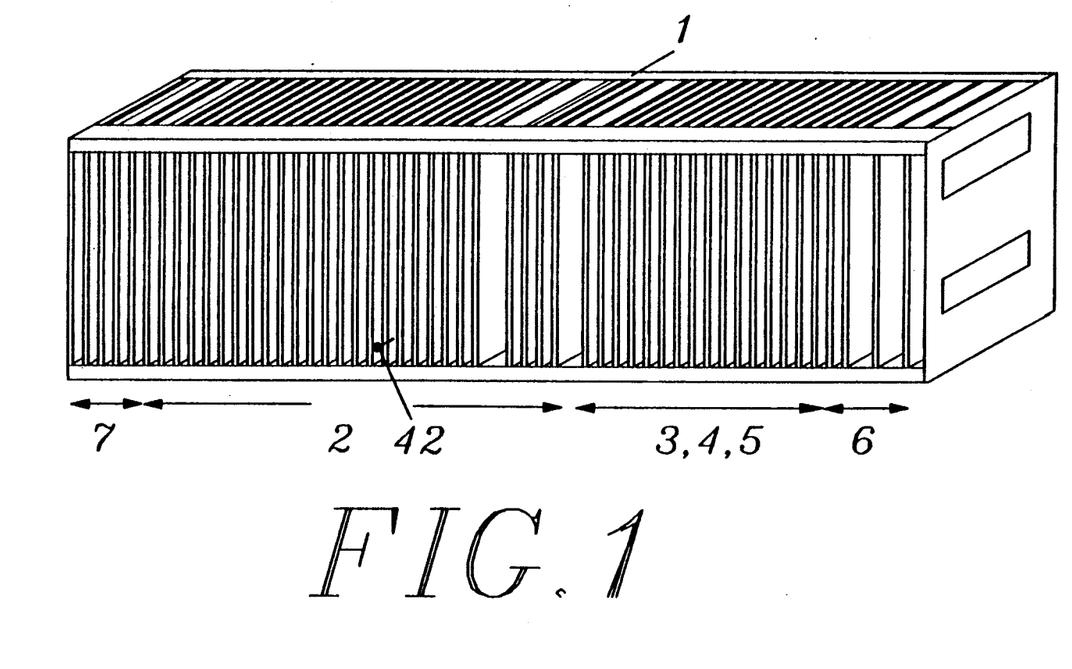
FIG. 1 is a perspective view of a telephone exchange module.

FIG. 1 illustrates a telephone exchange module which includes a magazine 1 which contains a plurality of densely packed circuit boards. More specifically, the magazine includes sixteen line boards 2. The telephone exchange module also includes a main control unit 3, a plurality of tone receivers 4 and other circuits used in the module, these other circuits being referenced generally with the reference numeral 5. The units 3, 4 and 5 are mounted on a plurality of boards in the magazine 1. The magazine 1 further includes a plurality of ring signal generating circuits 6, which are also mounted on boards placed in the magazine, and also a plurality of time selector circuits mounted on circuit boards 7.

Figure 2:
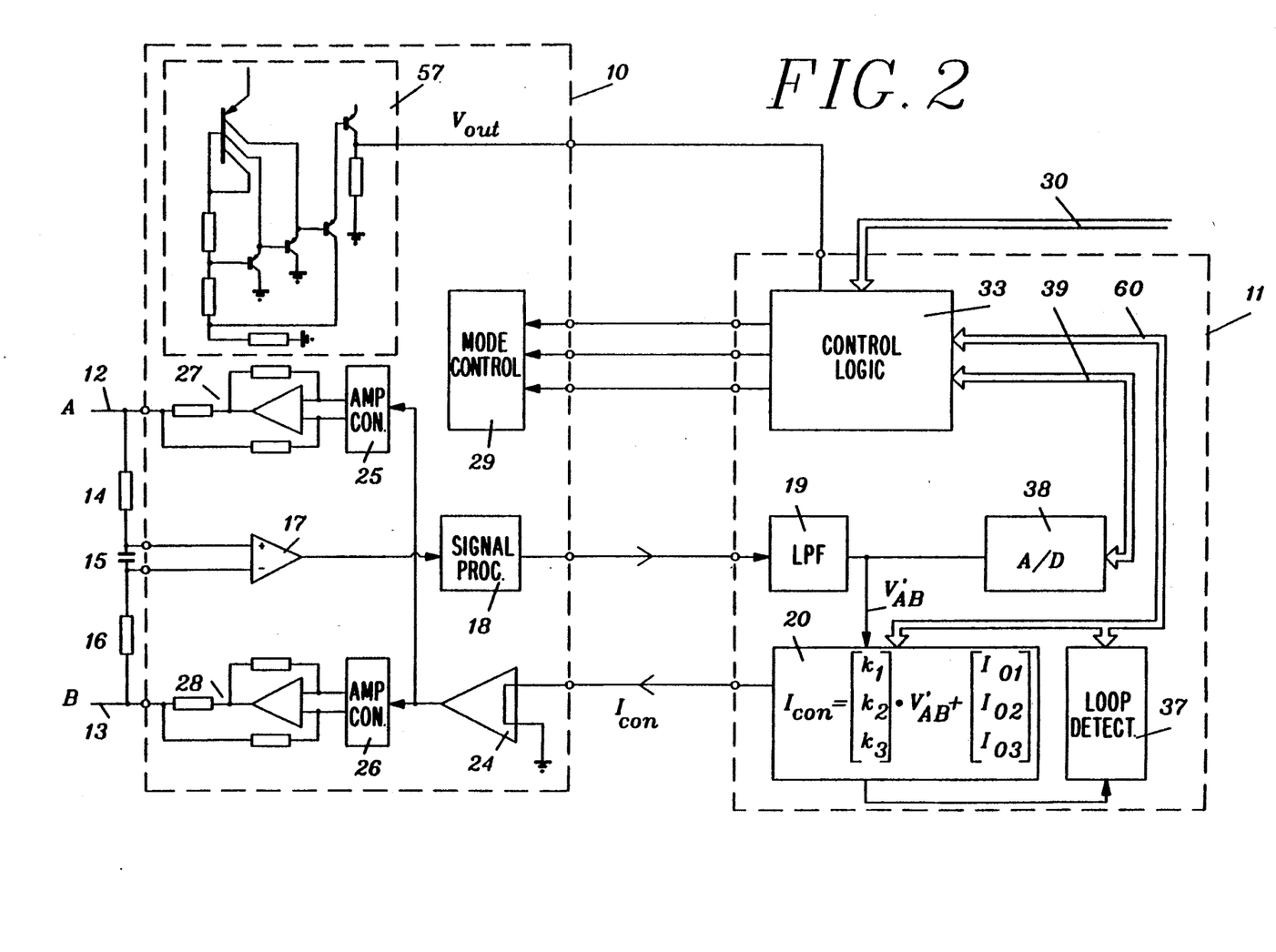
FIG. 2 is a schematic, block diagram illustrating a line circuit and an associated control circuit.

FIG. 2 illustrates a line circuit 10 and a control circuit 11 which controls the line circuit. Only those parts of the two circuits 10 and 11 which are relevant for the supply of current to the subscriber line to which the line circuit belongs are shown in the Figure. Thus, no speech paths, signalling means, etc. are shown in the Figure. The subscriber line includes, conventionally, an A-wire and a B-wire, which are referenced 12 and 13 respectively. Seated between the wires 12, 13 is a series combination consisting of a resistor 14, a capacitor 15 and a resistor 16. The supply of current to the subscriber line 12, 13 is controlled in the following manner: The voltage between the A and B wires is low-pass filtered in the R-C-R link formed by the resistors 14, 16 and the capacitor 15. The resultant d.c. voltage is detected by an amplifier 17. The level of the output signal from the amplifier 17 is shifted and scaled in a signal processing circuit 18 from a normal level of 20–50V to a level of about 0.5–1.25V, in order to enable the signal to pass the control circuit 11. Further filtration is carried out in a low-pass filter 19, for the purpose of eliminating the alternating voltage generated by speech signals on the line and superimposed on a d.c. voltage.

The control circuit 11 illustrated in FIG. 2 includes a current control circuit 20 in which a plurality of different current supply characteristics are stored, among them characteristics which correspond to conventional line supply above $2\times 250$ ohm, and the characteristic which corresponds to reduced supply, for instance corresponding to $2\times 10$ k$\Omega$ in accordance with the invention. The progress followed by these two characteristics is shown in FIG. 3.

In several countries, the subscriber line 12, 13 is normally supplied with 50 V across a supply resistance of $2\times 250$ ohm. When the subscriber line is short-circuited, the maximum current will then be 100 milliampere and the line voltage will be 50V, in the case of a line of indefinite length. This current supply characteristic is referenced with the line 21. It is proposed in accordance with the invention that the state of supplying the subscriber line with reduced line current, RP-state, shall have the characteristic corresponded by the broken line 22 in FIG. 3. This characteristic 22 follows the characteristic 21 until the line current reaches to about 25 milliampere, whereafter the characteristic is interrupted and follows a substantially horizontal part which, in accordance with the invention, corresponds to supplying the line with $2\times 10$ k$\Omega$.

Figure 3:
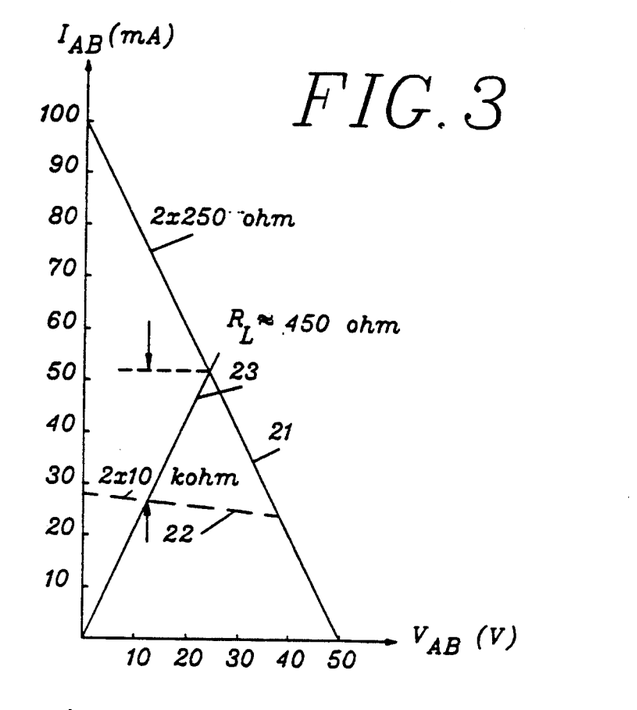
FIG. 3 is a diagram which illustrates two different current supply characteristics.

Assume that a subscriber line loads the line circuit to an extent that the load line 23 adopts the state illustrated in FIG. 3. Thus, in the case of normal current supply, a current of about 52 milliampere will be supplied to the subscriber line, whereas when a switch occurs to the RP-state, all subscriber lines will be supplied with only about 28 milliamperes. The line current is thus reduced by 24 milliamperes.

Figure 4:
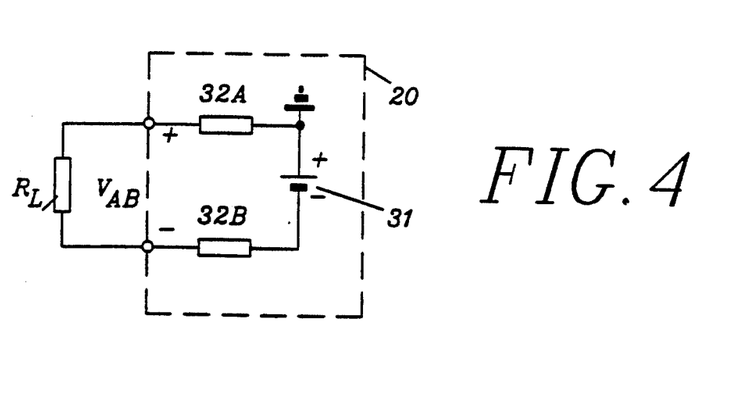
FIG. 4 is a simplified diagram of a current supply circuit.

It will also be seen from FIG. 2 that signals delivered to the control circuit 11 are transmitted over a bus line 30. The current control circuit 20 receives an order as to which characteristic shall be selected, from a selection signal transmitted on the bus line 30, this selection signal being obtained from the main control unit. The current control circuit 20 delivers current to an amplifier 24, on the basis of the selected characteristic and on the basis of the measured line voltage. The output signal of the amplifier 24 is sent to two control circuits 25, 26 each of which controls a respective current amplifier 27, 28 which sends the line current $I_L$ determined by said characteristic to the two wires 12, 13 of the subscriber line. The method of generating the desired line current $I_L$ can be described in the simplified manner illustrated in FIG. 4. The line circuit 10 and its control circuit 11 function to produce electronically an electric circuit of the kind illustrated in FIG. 4. This circuit includes a battery 31 with an earthed positive terminal. The subscriber line, represented by a load resistor $R_L$, is supplied from the battery through a respective supply resistance 32A and 32B. In reality, the battery voltage and the supply resistances are generated electronically. The EMF of the battery 31 and the supply resistances 32A and 32B are selected in accordance with selected current supply characteristics, so that the line supply current $I_L$ will equal $f(V'_{AB})$, where $V'_{AB}$ corresponds to the voltage that prevails between the A and B wires of the subscriber line subsequent to scaling in the signal processing circuit 18. The voltage $V'_{AB}$ is converted in the current control circuit to a current $I_{CON}$ in accordance with the relationship $I_{CON}=k_i V' + I_{oi}$, where $k_i$ and $I_{oi}$ (i=1, 2, 3, ...) are constants and have different values corresponding to different characteristics. The values of $k_i$ and $I_{oi}$ can be taken from a table, for instance. Alternatively, $k_i$ can be realized by applying $V'_{AB}$ on a resistor chosen from several resistors of which each resistor corresponds to a respective $k_i$-value. $I_{io}$ is generated in a corresponding manner, by applying a constant reference voltage to a resistor selected from several resistors, each corresponding to a respective $I_{io}$. Another alternative of generating $I_{con}$ is one in which $V'_{AB}$ is applied to a processor locally provided for the line circuit and which on the basis of $V'_{AB}$ and the desired characteristic functions to control the current control circuit (20) in a manner which causes the circuit to deliver the current $I_{con}=k_i V'_{AB}+I_{io}$. The current $I_{CON}$ is then supplied to the amplifier 24 and the control circuits 25, 26, these circuits and the current amplifiers being of the kind described in our aforesaid WO-patent specifications.

The operation parameters which shall be monitored in the telephone exchange module will now be described. The parameters are monitored and compared with reference values. When the reference values are exceeded, the RP-state is activated. The operation parameters are monitored continuously during this RP-state period and when they finally drop below the reference values, possibly beneath modified reference values, switching of the module to normal operation is initiated.

Figure 5A:
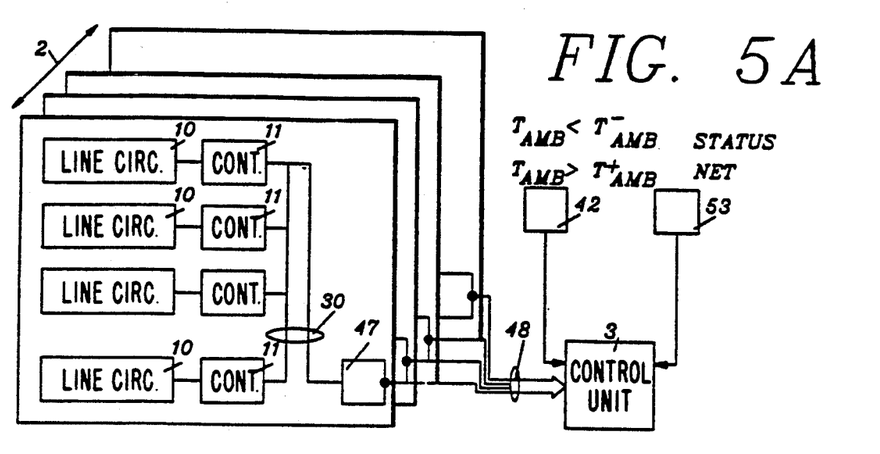
FIGS. 5a–5d are block schematics which illustrate a line circuit and a main control unit, the Figures also showing various combinations of monitored operation parameters.

FIG. 5a illustrates an embodiment according to which the ambient temperature $T_{AMB}$ of the line board 2 in the magazine 1 is monitored. The supply of current to the magazine from the power network is also monitored, in order to indicate the occurrence of a possible power failure.

It will be seen from FIG. 5a that each line board 2 includes a local processor 47 which monitors all line circuits, normally eight in number, on the line board and which searches the line circuits on the board and reports the status of the line circuits to the main control unit 3, via a bus line 48.

Figure 6:
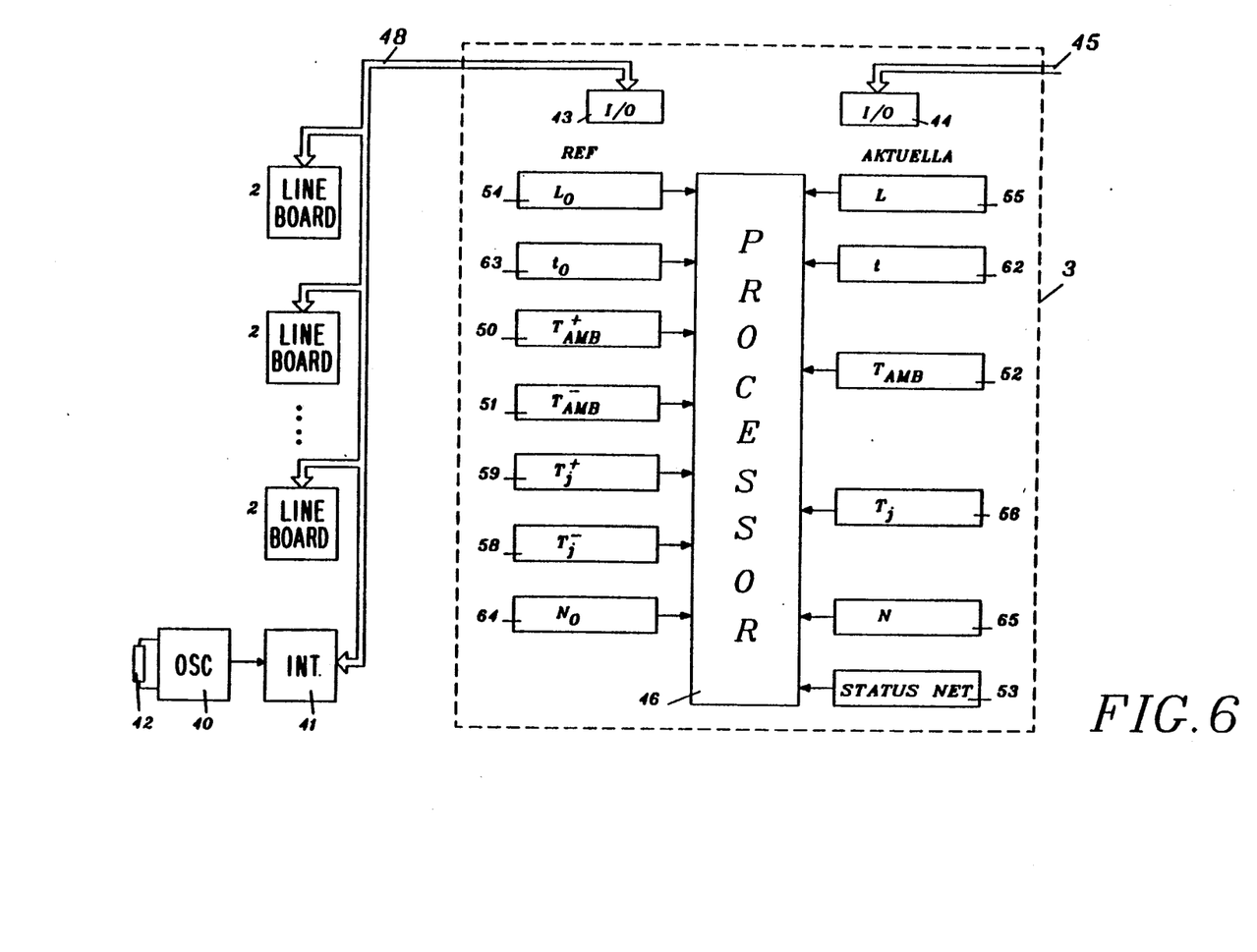
FIG. 6 is a block schematic which illustrates the inventive arrangement.

The ambient temperature is sensed by a temperature sensor in the form of an oscillator 40, shown in Figure 6, which is mounted on one of the boards in the magazine and which is connected to the bus line 48 through the intermediary of an interface 41. The oscillator circuit is conventional and includes a number of components which determine oscillator frequency. According to the invention, these components include a temperature responsive element 42, for instance a thermistor.

The temperature responsive element 42 is mounted in the room in which the magazine 1 is enclosed and projects out from the magazine 1, as illustrated schematically in FIG. 1. When the telephone exchange module operates normally, the oscillator produces an oscillation signal having the frequency f. A representation of the oscillator signal is transmitted, via bus lines 30, 48, to the main control unit 3, which includes a processor, schematically illustrated within the broken-line rectangle 3 in FIG. 6, via an I/O-unit 43, to which the bus line 48 extends. The processor 3 includes another I/O-unit 44 which is connected with a communication bus line 45. This latter communication bus line is connected with a central processor unit CPU (not shown) which is common to several telephone exchange modules. A block 46 included in the main control unit 3 represents a program which compares monitored operation parameters with the reference values of the operation parameters and which initiates the generation of a first control signal for switching to the RP-state, and a second control signal for switching to a normal operation state. The main control unit 3 also includes a plurality of storage regions in which the reference values of the operation parameters are stored. More specifically, the control unit includes a memory region 50 in which a first frequency value of the oscillator frequency is stored. This first reference value corresponds to the circumstance when the ambient temperature $T_{AMB}$ is higher than a predetermined temperature $T+_{AMB}$, e.g. 40° C., and indicates that the RP-state shall be activated. The unit also includes a memory region 51 in which a second oscillator frequency reference value is stored. This second reference value corresponds to the circumstance when the ambient temperature $T_{AMB}$ has a value $T-_{AMB}$ suitable for normal operation, e.g. 37° C., and when the second control signal shall be produced and that the RP-state shall therefore be deactivated and a switch made to normal supply. When $T+_{AMB} > T-_{AMB}$ a temperature hysteresis is obtained.

The prevailing value of the oscillator frequency, i.e. the prevailing temperature value $T_{AMB}$ is stored in a memory region 52, which is updated periodically.

When the telephone exchange includes several telephone exchange modules, the temperature transducer, or temperature responsive element 42 may be placed centrally in the room in which all modules 1 are arranged. In this case, the arrangement will preferably include an additional temperature responsive element, in order to make the arrangement more reliable.

It is thus evident that when the first control signal is delivered, all 128 subscriber lines connected to the module will be switched to the RP-state.

The prevailing status of the power network, i.e. whether or not there is a power failure, is indicated by means of a status signal which is sent from the central processor unit CPU (not shown) of the exchange on the communication bus line 45. This status signal is stored in a memory region 53. When the status signal corresponds to normal mains operation, the program block 46 delivers the second control signal, whereas if the status signal corresponds to a power failure, the program block 46 delivers the first control signal for activating the RP-state, wherewith all subscriber lines in the module are switched to the RP-state.

It will be seen from FIG. 2 that each line circuit 10 receives the signals on the bus line 30, via a control logic block 33 having three parellel data outputs on which data signals D0, D1 and D2 are sent to a control circuit 29 for adjusting the line circuit 10 to different operational modes.

The control logic block 33 is connected to the current control circuit 20 and to a loop detector circuit 37, via a bus line 60. The control logic block is also connected to the A/D-converter 38, via bus 39. These circuits are described below in more detail. When the current control circuit 20 receives the first control signal, the signal selects the current supply characteristic 22, whereas when it receives the second control signal said circuit selects the current supply characteristic 21.

Figure 5B:
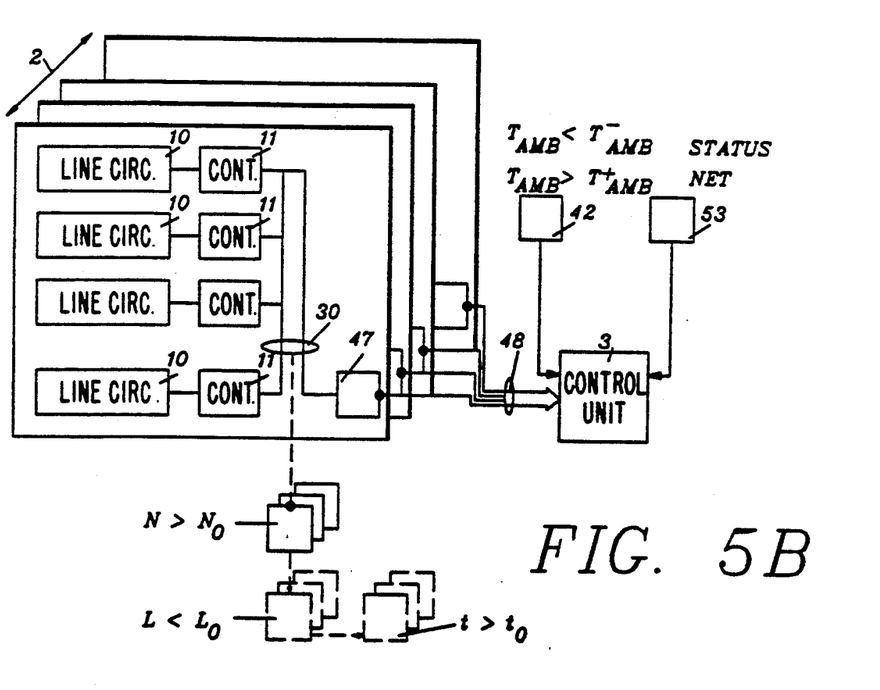

FIG. 5b illustrates a variant of the monitoring system illustrated in FIG. 5a. In the case of the FIG. 5b embodiment, it is possible to reduce the number of lines which are ordered to take the RP-state when the ambient temperature exceeds the first reference value $T+_{AMB}$. When the number of active lines N on a line board is greater than a threshhold value $N_o$, e.g. $N_o=4$, and when the ambient temperature $T_{AMB}$ is greater than the predetermined first reference value $T+_{AMB}$, this is reported to the main control unit 3 which therewith orders activation of the RP-state for all line circuits on that line board where $N > N_o$. Thus, only those line boards on which the threshhold value $N_o$ is exceeded will be ordered to take the RP-state. For instance, if $N_o \leq 4$ in all 16 line boards 2, the RP-state will not be initiated in these 64 subscriber lines. This shall be compared with the case according to FIG. 5a, where all 128 lines are ordered to the RP-state when the detected temperature exceeds the first ambient temperature reference value $T+_{AMB}$.

The threshhold value $N_o$, i.e. the number of active lines on each board, is stored in a memory region 64 (see FIG. 6) and is compared with the number of active lines N on each board, which is reported continuously by each local processor 47 to the main control unit 3. The prevailing value N of the number of active line circuits on a line board is stored in a memory region 65. This storage procedure is carried out continuously with prevailing values from line board to line board, and the program block 46 calculates whether or not the threshhold value $N_o$ has been exceeded, with each prevailing value. An active line circuit is monitored by the loop detector 37, which detects when the line is supplied with line current. The state of the loop detector is monitored by the local processor 47 which controls the logic block 33 and the bus line 30, via the bus line 60. When the loop detector 37 detects line current, a report to this effect is sent to the main control unit 3.

Figure 5C:
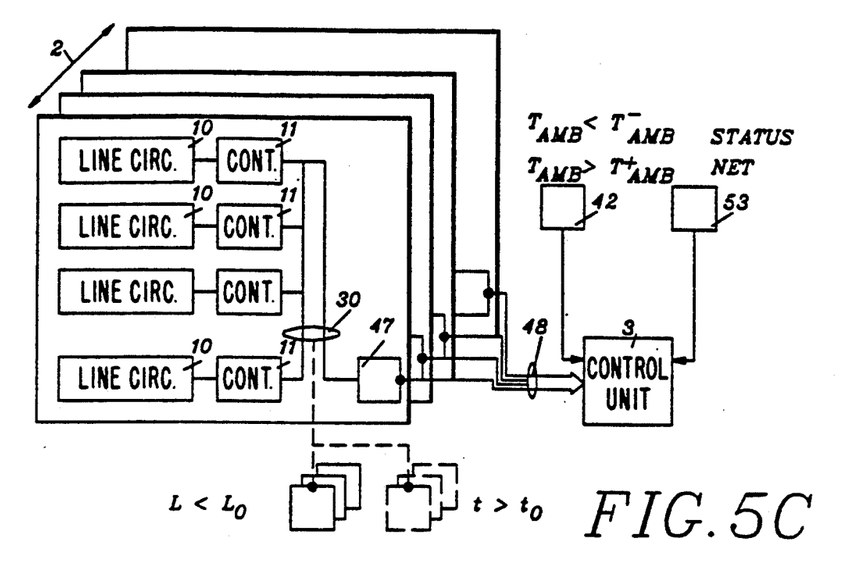

FIG. 5c illustrates another suitable combination of operation parameters to be monitored. In this case, both the ambient temperature $T_{AMB}$ and the subscriber line length L are sensed, in addition to the possible occurrence of a power failure. The manner in which the length of a subscriber line influences the line current will be evident from FIG. 3. The shorter the subscriber line, the lower is its ohmic resistance and the greater is the extent to which the load line $R_L$ is rotated anticlockwise around the origo from the position illustrated in FIG. 3, therewith increasing subscriber line current and therewith also the power losses.

A reference value $L_o$ of the length of the subscriber line is stored in a memory region 54 (see FIG. 6) and the prevailing line length value L for each subscriber line belonging to the line boards in the magazine 1 are stored in a memory region 55 in the main control unit 3. The ohm-unit is normally used as a measurement of the length of a subscriber line.

The line length L is determined by detecting the line voltage $V'_{AB}$ with the aid of the amplifier 17. The voltage is signal-processed in the signal processing circuit 18 and low-pass filtered in the low-pass filter 19, and passes to the A/D-converter 38 on whose output the voltage value is produced in digital form and is transmitted to the control logic block 33, via a bus line 39. The signal is sent from the block 33 to the local processor 47, via the bus line 30, and from the local processor 47 to the main control unit 3, via the bus line 48. When the ambient temperature $T_{AMB}$ is greater than the first reference value $T^+{}_{AMB}$ and the line length L is shorter than the line length reference value $L_o$, the control unit 3 delivers the first control signal over the bus line 48 only to those lines which are shorter than the reference value. The RP-state is activated solely for these lines. This may now be sufficient for the temperature to fall beneath the second temperature reference value $T^-{}_{AMB}$.

However, if the temperature does not fall to $T^-{}_{AMB}$, only the short subscriber lines will be switched to the RP-state, whereas other lines will operate with normal supply. In order not to subject all the owners of short subscriber lines to the disadvantage implied by the RP-state, it is possible, in accordance with the invention, to include the condition that of the "short" subscriber lines only those lines are switched to the RP-state on which traffic has prevailed for such a long period that the call or conversation length t has exceeded a reference value $t_o$, e.g. 4 minutes. This condition is illustrated schematically by the broken lines and the rectangles in FIG. 5c.

The length of a call is monitored by the loop detector circuit 37, illustrated in FIG. 2, which senses continuously whether or not line current is supplied to the subscriber line 12, 13. The line current is supplied during an ongoing call. The supply of line current is terminated when the subscriber replaces the receiver, optionally after a time delay, which is reported to the control logic block 33 by the loop detector circuit 37, via the bus line 60. The control logic block 33 sends this signal to the bus lines 30, 48 connected to the main control unit 3, which measures the duration t of this signal. The value of the duration of this signal is stored in a memory region 62 and is updated continuously. The call length reference value $t_o$ is stored in a memory region 63. When the call length, or call duration, exceeds the reference value, the main control unit 3 sends the first control signal to the line circuits on which the call is made and orders a transition to the RP-state. None of the other short subscriber lines is switched to the RP-state.

Figure 5D:
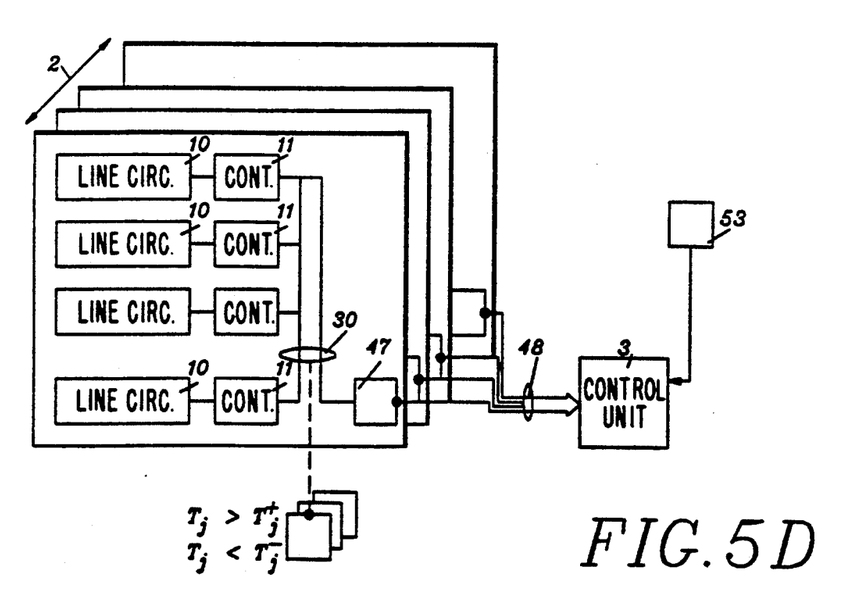

FIG. 5d illustrates still another operation parameter which is capable of detection and which can suitably be made the basis for switching to the RP-state. In this case, the temperature $T_j$ of the warmest component or the warmest circuit in each line interface circuit is detected or sensed, in addition to the status of the power network. The line circuit is normally an integrated circuit in the form of a capsule made, for instance, of plastic material, from which a number of legs extend. A temperature sensor 57 (see FIG. 2) is arranged adjacent the circuit, for the purpose of measuring circuit temperature. Alternatively, the temperature sensor may be integrated in the integrated circuit and may receive its supply voltage from the line circuit. The temperature sensor 57 includes a temperature responsive transistor circuit which changes its output voltage $V_{OUT}$ when the circuit temperature $T_j$ exceeds a first temperature reference value $T^+{}_j$ stored in a memory region 59 in the main control unit 3. The temperature value $T_j$ is stored in another memory region 56 and is continuously updated. When the capsule temperature exceeds $T^+{}_j$, the main control unit 3 produces the first signal and the individual line circuit is switched to the RP-state. The reason why only the individual line circuit is affected by signals on the bus line 30 is because it is only this individual line circuit which is addressed. As the capsule cools and its temperature drops to a second reference value $T^-{}_j$, which is stored in a memory region 58 and which is smaller than $T^+{}_j$, the main control unit sends the second control signal to the individual line circuit. Temperature sensing, or detection, thus takes place individually for each line circuit and therewith affords a more accurate temperature facility than that afforded by the FIG. 5a embodiment, since temperature is monitored at precisely the location where the greatest risk of overheating prevails.

According to one alternative embodiment, the temperature sensor 57 can be arranged for measuring the temperature at that leg of the capsule where it is known that the largest current passes. Normally, the maximum circuit temperature is about 110° C. and the maximum leg temperature 85° C. The temperature sensor 57 is biased with the aid of a resistor in some suitable manner, so that the sensor output signal will be, for instance, $+5V$ when the maximum temperature for the line circuit is reached and so that this signal is 0V when the temperature of the circuit returns to a normal operating temperature.

As a modification to the embodiment illustrated in FIG. 5d, where the circuit temperature or solder temperature is reported to the main control unit 3 and where the control unit 3 orders transition to the RP-state of the individual line circuit concerned, it is possible to include a facility in which the output signal $V_{OUT}$ of the temperature sensor 57 is compared with the reference value $T^+{}_j$ and $T^-{}_j$ directly in the control logic block 33, wherein the control logic block produces respective control signals for switching the lines to and from respective RP-states. This relieves the main control unit 3 from its local temperature monitoring function. All state changes, however, must be reported to the main control unit 3.

As a modification to the monitoring facility of the FIG. 5b embodiment, the condition can be included that when $T_{AMB} > T^+{}_{AMB}$, the RE-state is not initiated in all line circuits on the line board when the threshhold value $N_o$ is exceeded, but only in those line circuits (among those which are found on a line board where $N_o$ has been exceeded) which have a line length L which is shorter than the line length reference value $L_o$. Still another modification is one in which the RP-state is intiated solely in those line circuits (among those found on a line board where $N_o$ has been exceeded) where a call has continued over a time t which is greater than the call length reference value $t_o$ for the call length.

Another alternative is that when $T_{AMB} > T^+{}_{AMB}$, the RP-state is not initiated in all line circuits on those line boards where the threshhold value $N_o$ has been exceeded, but solely on those line circuits where $L < L_o$ and $t > t_o$.

The aforedescribed embodiments of the invention can be modified and varied in many ways within the scope of the following claims.

What is claimed is:

1. A system for controlling the line current of a plurality of subscriber lines connected to a line circuit card comprising:
   means for monitoring an operation parameter selected from a group including line circuit card ambient temperature, component temperature and mains power to a telephone exchange,
   means for storing a reference value for the monitored operation parameter,
   means for comparing a current value of the monitored operation parameter with a reference value and for generating a first control signal where the comparison indicates that the current value of the monitored operation parameter is greater than the reference value and for generating a second control signal when the current value is less than the reference value, and
   means for controlling a supply of power to each individual subscriber line of a line circuit card and for supplying a first power level in response to said first control signal and for supplying a second power level in response to the second control signal.

2. The system of claim 1 wherein:
   said control means allows said system to dynamically switch from a condition with a normal power supply to a condition with a reduced power supply, and maintains the condition of said reduced power supply until the monitored operation parameter rises above the reference value at which time to control means switches back to a condition with a normal power supply.

3. The system of claim 1, wherein:
   said monitored operation parameter is line circuit card ambient temperature,
   said monitoring means measures ambient temperature, and
   said comparing means sends said second control signal to substantially all of said power supply control means.

4. The system of claim 3, wherein:
   said storing means stores a first line circuit card ambient reference temperature and a second line circuit card ambient reference temperature which is lower than said first reference temperature, and
   said comparing means generates said first control signal when the monitored ambient temperature is below said second line circuit card ambient reference temperature and generates said second control signal when the monitored ambient temperature exceeds said first line circuit card ambient reference temperature.

5. The system of claim 1, wherein:
   said monitored operation parameter is line circuit card ambient temperature,
   said monitoring means measures ambient temperature, and
   said comparing means sends said second control signal to power supply control means selected from a group consisting of subscriber lines that are shorter than a predetermined subscriber length reference value, subscriber lines on which a telephone conversation has exceeded a predetermined call length reference value, and subscriber lines having a number of active subscriber lines of a line circuit card which exceeds a predetermined active line reference value.

6. The system of claim 5, wherein:
   said storing means stores a first line circuit card ambient reference temperature and a second line circuit card ambient reference temperature lower than said first reference temperature, and
   said comparing means generates said first control signal when the monitored ambient temperature is below said second line circuit ambient reference temperature and generates said second control signal when the monitored ambient temperature exceeds said first line circuit card ambient reference temperature.

7. The system of claim 1, wherein:
   said monitored operation parameter is component temperature, and
   said comparing means sends said second signal to the power supply control means of the subscriber line circuits having a component temperature which exceeds said component temperature reference value.

8. The system of claim 7, wherein:
   said storing means stores a first line circuit card component reference temperature and a second line circuit card component reference temperature lower than said first component reference temperature, and
   said comparing means generates said first control signal when the monitored component temperature is below said second line circuit card component reference temperature and generates said second control signal when the monitored component temperature exceeds said first line circuit card component reference temperature.

9. The system of claim 1, wherein:
   said monitored operation parameter is mains power to the telephone exchange, and
   said comparing means sends said second signal to substantially all power supply control means.

10. A method for controlling the line current of a plurality of subscriber lines connected to a line circuit card comprising the steps of:
    monitoring an operation parameter selected from a group including line circuit card ambient temperature, component temperature and mains power to a telephone exchange,
    storing a reference value for the monitored operation parameter,
    comparing a current value of the monitored operation parameter with a reference value,
    generating a first control signal when the comparison indicates that the current value of the monitored operation parameter is greater than the reference value or generating a second control signal when the current value is less than the reference value,
    sending said second control signal to predetermined subscriber line current control circuits, and
    controlling a supply of power to each individual subscriber line of a line circuit card and supplying its individual subscriber line with a first power level in response to said first control signal and supplying with a second power level in response to the second control signal.

11. A system for controlling line current in signal lines comprising:
    means for transmitting signals over said signal lines;
    means for periodically detecting a value of at least one time-varying parameter of said system selected from a group including ambient temperature, component temperature, and mains power; and means for selectively reducing current supplied to at least one of said signal lines from a first current level to a second current level when said detected value goes beyond a corresponding reference value.

12. The system of claim 11 wherein said detecting means detects a value of ambient temperature as said at least one time varying parameter and said reducing means reduces said supplied current if said detected value is greater than a predetermined reference temperature value.

13. The system of claim 11 wherein the detecting mean detects both an ambient temperature and a number of active signal lines as said at least one time varying parameter and said reducing means reduces said supplied current when the detected ambient temperature is greater than a predetermined reference temperature value and the detected number of active signal lines is greater than a predetermined reference line value.

14. The system of claim 11 wherein said detecting means detects ambient temperature and a duration of calls on said signal lines as said at least one time varying parameter and said reducing means reduces said supplied current when the detected ambient temperature is greater than a predetermined reference temperature value and the detected duration of a call exceeds a predetermined reference call duration value.

15. The system of claim 11 wherein said detecting means detects an ambient temperature and said reducing means reduces said supplied current when the detected ambient temperature is greater than a predetermined reference temperature value and a length of at least one of the signal lines is shorter than a predetermined reference length value.

16. The system of claim 11 wherein said detecting means detects a temperature of a component in a line board of said system and said reducing means reduces said supplied current when the detected temperature is greater than a predetermined reference temperature value.

17. The system of claim 12 wherein said reducing means reduces said supplied current to all of said signal lines when said detected ambient temperature is greater than said predetermined reference temperature value.

18. The system of claim 13 wherein said reducing means reduces said supplied current only to signal lines which are active when said detected ambient temperature is greater than the predetermined reference temperature value and the number of active signal lines is greater than the predetermined reference line value.

19. The system of claim 14 wherein said reducing means reduces said supplied current only to those signal lines having a detected call duration which exceeds said predetermined reference call duration value.

20. The system of claim 15 wherein said reducing means reduces said supplied current only to those signal lines which are shorter than said predetermined reference length value.

21. The system of claim 16 wherein said reducing means reduces said supplied current only to the signal line which is associated with the line board having a component detected temperature greater than said predetermined reference temperature value.

22. The system of claim 11, further comprising:
means for comparing said at least one detected time varying parameter to at least one corresponding reference value, wherein said reducing means reduces said supplied current based on a result of said comparing means, and
means for increasing said supplied current back to said first current level based on a second result of said comparing means.

23. The system of claim 11, wherein said detecting means detects a system power supply and said reducing means reduces said supplied current when the system power supply is lower than a predetermined power level.

24. The system of claim 23, wherein said reducing means reduces said supplied current to substantially all of said signal lines.

* * * * *